United States Patent [19]

Miller et al.

[11] Patent Number: 4,880,443
[45] Date of Patent: Nov. 14, 1989

[54] MOLECULAR SIEVE OXYGEN CONCENTRATOR WITH SECONDARY OXYGEN PURIFIER

[75] Inventors: George W. Miller; Clarence F. Theis, both of San Antonio, Tex.

[73] Assignee: The United States of America as represented by the Secretary of the Air Force, Washington, D.C.

[21] Appl. No.: 288,315

[22] Filed: Dec. 22, 1988

[51] Int. Cl.$^4$ ............................................. B01D 53/04
[52] U.S. Cl. .......................................... 55/26; 55/58;
55/62; 55/66; 55/68; 55/74; 55/75; 55/162;
55/179; 55/387; 55/389
[58] Field of Search .................... 55/18, 20, 21, 25, 26,
55/58, 62, 66, 68, 74, 75, 161–163, 179, 387, 389

[56] References Cited

U.S. PATENT DOCUMENTS

| | | | |
|---|---|---|---|
| 3,252,268 | 5/1966 | Stark | 55/25 |
| 3,922,149 | 11/1975 | Ruder et al. | 55/25 X |
| 4,011,065 | 3/1977 | Münzner et al. | 55/25 |
| 4,190,424 | 2/1980 | Armond et al. | 55/58 |
| 4,272,265 | 6/1981 | Snyder | 55/389 |
| 4,386,945 | 6/1983 | Gardner | 55/26 |
| 4,404,005 | 9/1983 | Hamlin et al. | 55/179 X |
| 4,428,372 | 1/1984 | Beysel et al. | 55/25 X |
| 4,448,592 | 5/1984 | Linde | 55/179 X |
| 4,519,813 | 5/1985 | Hagiwara et al. | 55/26 |
| 4,529,412 | 7/1985 | Hayashi et al. | 55/25 |
| 4,537,607 | 8/1985 | Rogers et al. | 55/179 X |
| 4,561,287 | 12/1985 | Rowland | 73/23 |
| 4,566,881 | 1/1986 | Richter et al. | 55/25 |
| 4,648,888 | 3/1987 | Rowland | 55/25 X |
| 4,661,124 | 4/1987 | Hamlin et al. | 55/68 X |
| 4,661,125 | 4/1987 | Haruna et al. | 55/26 |
| 4,684,377 | 8/1987 | Haruna et al. | 55/26 |
| 4,737,167 | 4/1988 | Ohtani et al. | 55/26 |
| 4,737,170 | 4/1988 | Searle | 55/179 |
| 4,744,803 | 5/1988 | Knaebel | 55/25 |
| 4,756,723 | 7/1988 | Sircar | 55/25 |
| 4,783,205 | 11/1988 | Searle | 55/179 X |
| 4,813,979 | 3/1989 | Miller et al. | 55/25 |

FOREIGN PATENT DOCUMENTS 3402533 8/1985 Fed. Rep. of Germany .......... 55/25

OTHER PUBLICATIONS

WO85/01451, PCT Application of Dangieri et al., published on Apr. 11, 1985.

Primary Examiner—Robert Spitzer
Attorney, Agent, or Firm—Bernard E. Franz; Donald J. Singer

[57] ABSTRACT

The apparatus comprises four cylindrical absorbent beds of small particle size (16×40 mesh) molecular sieve, two with zeolite and two with carbon molecular sieve. The units are integrated with each carbon bed in series with one of the zeolite beds, with valving at the inlets to the zeolite beds and at the outlets from the carbon beds. The oxygen purity of the gas is increased by selectively adsorbing and exhausting the nitrogen component in the zeolite beds and the argon component in the carbon beds. In a two step cycle, during step 1 of the cycle one pair of beds (one zeolite and one carbon) receives high pressure air as feed gas which pressurizes the beds and establishes a product oxygen flow. Simultaneously, the high pressure gas in the other pair of beds is vented to a lower pressure usually the ambient surroundings, and this depressurization serves to desorb the nitrogen and argon previously adsorbed during the high pressure phase of the cycle. In step 2 of the cycle the adsorbent beds exchange roles. This constant cycling results in a continuous product stream of very high purity oxygen (up to 99.1%). The separation is conducted at a temperature of 297° K. The secondary purifier does not require a regenerative purge flow for the carbon beds for efficient operation, which minimizes the feed gas consumption.

9 Claims, 2 Drawing Sheets

MOLECULAR SIEVE OXYGEN CONCENTRATOR WITH SECONDARY OXYGEN PURIFIER

RIGHTS OF THE GOVERNMENT

The invention described herein may be manufactured and used by or for the Government of the United States for all governmental purposes without the payment of any royalty.

RELATED APPLICATION

This application is related to a copending patent application by the same inventors, titled "Secondary Oxygen Purifier for a Molecular Sieve Oxygen Concentrator" (hereinafter "our secondary purifier patent"), Ser. No. 07/151/383, filed Feb. 2, 1988, now U.S. Pat. No. 4,813,979, issued Mar. 21, 1989, which is hereby incorporated by reference. Priority under 35 U.S.C. 120 is claimed, both applications being assigned to The United States of America as represented by the Secretary of the Air Force.

BACKGROUND OF THE INVENTION

The present invention relates to a molecular sieve oxygen concentrator with a secondary oxygen purifier.

Molecular sieve oxygen concentrators have attracted considerable attention recently because they are capable of producing high purity oxygen (about 95%) in a simple, cost-effective manner. Further, this oxygen has been found acceptable as a breathing as for patients requiring oxygen therapy and for aircrew hypoxia protection. These concentrators operate on the principle of pressure swing adsorption (PSA), whereby, the pressure of the adsorbent beds is cycled at a typical rate of 10 sec/cycle. This rapid cycling improves the oxygen-nitrogen separation efficiency of the concentrator resulting in a significant reduction in the unit's weight and volume. During this cycling the nitrogen component of the air is adsorbed at high pressure and desorbed at low pressure to the surroundings. Concentrators operating on this principle are present onboard the USAF B1-B strategic bomber and the USN AV-8B fighter.

The simplest oxygen concentrator is composed of two cylindrical absorbent beds containing a zeolite molecular sieve, valving, and an orifice. In a typical two-step cycle, during step 1 of the cycle one bed receives high pressure (20–40 PSIG) feed air which pressurizes the bed and establishes a product oxygen flow, and the nitrogen component of the air is removed by preferential adsorption in the zeolite molecular sieve. Simultaneously, the high pressure gas in the other bed is vented to a lower pressure usually the ambient surroudings, and this depressurization serves to desorb the nitrogen previously adsorbed during the high pressure phase of the cycle. Also, a portion of the product gas from the high pressure bed is fed to the low pressure bed to flush the nitrogen-rich gas from that bed. The orifice serves to control the flow of purge gas. In step 2 of the cycle the adsorbent beds exchange roles. This constant cycling results in a continuous product stream of high purity oxygen.

One limitation of a concentrator containing a zeolite molecular sieve is the maximum oxygen purity of 95% (the remainder is argon). Because the oxygen and argon molecules are similar in size and are nonpolar they both are concentrated upon passage through the beds of zeolite molecular sieve.

U.S. patents of interest include U.S. Pat. No. 4,661,125 to Haruna et al, which relates to a process for producing high concentration oxygen by a pressure swing adsorption method. According to this patent, argon-containing oxygen obtained by a PSA method conducted in a first step adsorption apparatus packed with a xeolite molecular sieve is introduced into a second step adsorption apparatus comprising three adsorption columns each packed with a carbon molecular sieve and is subjected to a PSA operation, whereby oxygen is preferentially adsorbed by the carbon molecular sieve and argon is separated from oxygen as a non-adsorbed gas. Production of high concentration oxygen having a concentration of 99% or higher is disclosed.

U.S. Pat. No. 4,566,881 to Richter et al discloses a process and apparatus for producing oxygen with a low friction of argon from air involving a first adsorption unit comprising at least two adsorbers containing carbon molecular sieve which provides an intermediate product that is enriched with oxygen and depleted of argon by comparison to the supplied N2/O2/Ar gas mixture. Thereafter the intermediate product is subjected to zeolite adsorption in an adsorption unit. This patent discloses that when the method is carried out with a dry and carbon-dioxide-free air, oxygen is produced with a plurality of 99.7 volume percent during the adsorption phase of the zeolite adsorption unit. This patent further discloses that the regeneration of the zeolite-bed adsorbers is interrupted while the first of carbon-bed absorbers are regenerated by a vacuum pump which is used in common to regenerate the adsorbers.

Similarily U.S. Pat. No. 4,190,424 to Armond et al discloses integrating the zeolite and carbon sieve processes to produce oxygen with a purity better than that which can be achieved by either of the known processes operated alone. The overall performance of this process is enhanced by the recycling as feedstock of an oxygen-rich gas stream from the second section to the first. A product stream with a proportion of oxygen as high as 99.7% is cited for one embodiment (see col 3, line 37).

U.S. Pat. No. 4,529,412 to Hayashi et al relates to a process for obtaining high concentration argon from air by means of pressure-swing adsorption, characterized by passing air through a zeolite molecular sieve-packed adsorption apparatus and a carbon molecular sieve-packed adsorption apparatus in this order, subjecting the air to pressure-swing-adsorption operation independently in the above pieces of adsorption apparatus, thereby obtaining concentrated argon and high purity oxygen simultaneously. Other patents relating to oxygen generators or concentrators which rely on molecular sieves include 4,561,287 to Rowland, and 4,272,265 to Snyder; and the latter cites aircraft applicability.

SUMMARY OF THE INVENTION

An objective of the invention is to increase the oxygen concentration of the product gas from a zeolite molecular sieve oxygen concentrator.

The invention is directed to molecular sieve oxygen concentrator, having an integrated secondary oxygen purifier, which provides a simple and cost-effective process for producing concentrated oxygen with a purity of more than 99% from a compressed air feed stream compared to oxygen concentrators producing 95% purity oxygen. This invention involves a device comprised of four interdependent adsorption beds, two of which contain zeolite molecular sieves and the other two contain carbon molecular sieves, six air operated valves, a solenoid activated valve, a manual valve and a programmable solenoid actuator. Each of the zeolite beds is connected in series with a carbon molecular sieve bed, so that the gas flow must pass sequentially from a zeolite molecular sieve bed to a carbon molecular sieve bed. The valves are operated in half cycles to withdraw the product gas from the carbon molecular sieve beds alternately.

A feature of the invention is that it uses a simple process to concentrate oxygen in a feed air stream to a maximum purity of more than 99%, while comsuming the same amount of air as present oxygen concentrators.

Another feature is that a secondary oxygen purifier has been integrated with a zeolite molecular sieve concentrator, such that, the secondary oxygen purifier does not operate as a separate device with a single inlet stream but receives two inlet streams.

Another feature is that a regenerative purge flow is not required for the secondary beds, which minimizes the feed air consumption.

The apparatus uses small particle size (16×40 mesh) carbon molecular sieve to improve the efficiency of the oxygen-argon separation.

Advantages are that the apparatus consumes the same amount of feed air, and the size and weight is about the same, as present oxygen concentrators which produce 95% purity oxygen.

The invention can be used for generating high purity oxygen for aircraft breathing systems, field hospitals, and portable oxygen therapy.

DETAILED DESCRIPTION

Figure 1:
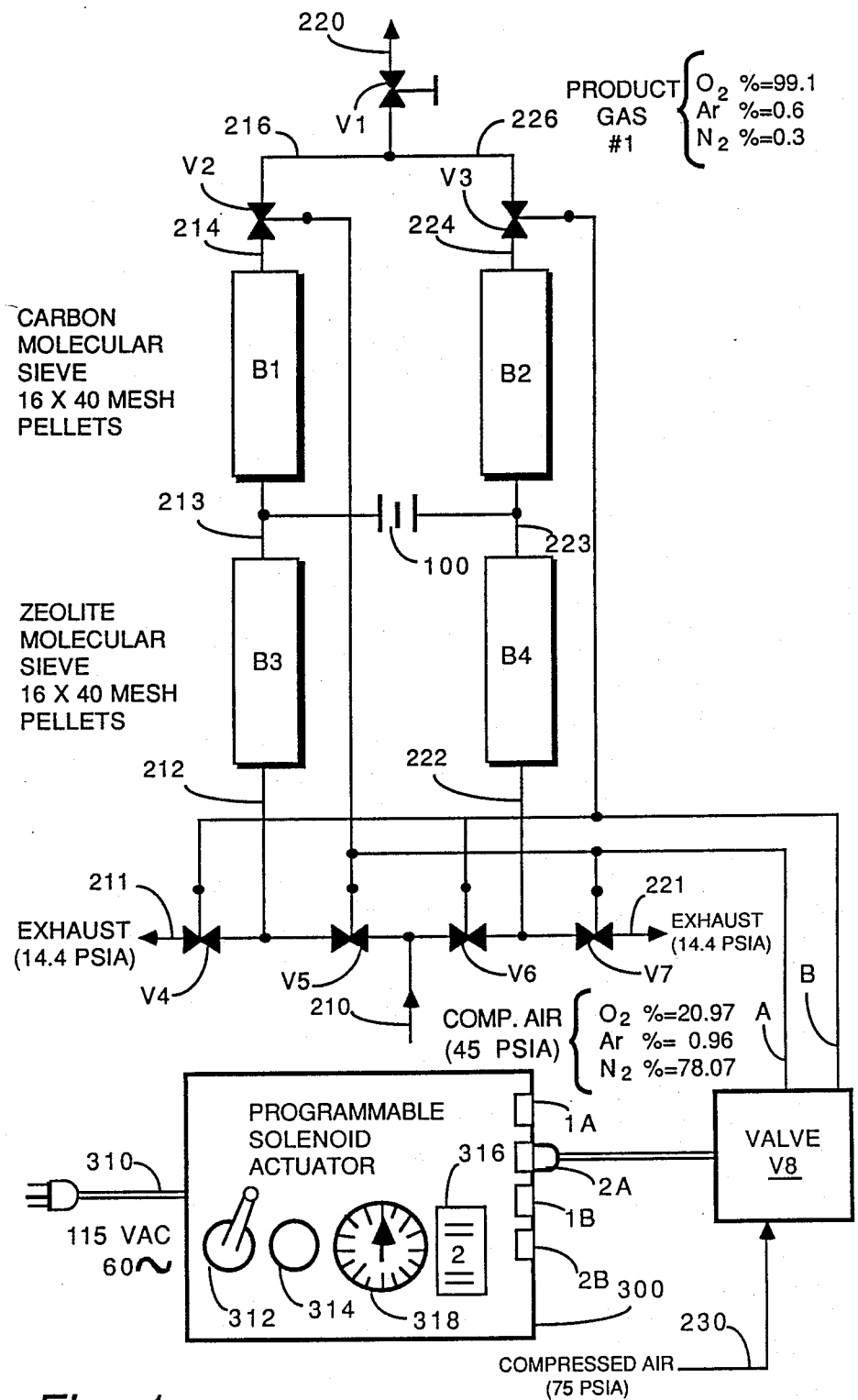
FIG. 1 is a schematic diagram showing a molecular sieve oxygen concentrator having an integrated secondary oxygen purifier for an aircraft oxygen generating system.

As shown in FIG. 1 of our secondary purifier patent, the simplest typical prior art oxygen concentrator is composed of two cylindrical adsorbent beds containing a zeolite molecular sieve, valving, and an orifice 10; and operates in a two-step cycle. During step 1 of the cycle one bed receives high pressure (20-40 PSIG) feed air which pressurizes the bed and establishes a product oxygen flow. The nitrogen component of the air is removed by preferential adsorption in the zeolite molecular sieve. Simultaneously, the high pressure gas in the other bed is vented to a lower pressure usually the ambient surroundings. An orifice serves to control the flow of purge gas. In step 2 of the cycle the adsorbent beds exchange roles. This constant cycling results in a continuous product stream of high purity oxygen.

A schematic of a miniaturized version of the apparatus for practicing the invention is shown in FIG. 1. The apparatus is composed of four adsorbent beds B1–B4, two of which are carbon molecular sieve beds B1 and B2 each containing about 177 grams of 16×40 mesh pellets, and two of which are zeolite molecular sieve beds B3 and B4 each containing about 230 grams of 16×40 mesh pellets. Each zeolite molecular sieve bed is placed in series with one of the carbon molecular sieve beds, with bed B3 in series with bed B1, and bed B4 in series with bed B2, so that gas flow must pass sequentially through a zeolite molecular sieve bed to a carbon molecular sieve bed. An orifice 100 (ID=0.071 cm) joins the outlets 213 and 223 of the two zeolite molecular sieve beds B3 and B4. Beds B1 and B2 are constructed of polyvinylchloride (PVC) pipe (OD=4.83 cm, ID=3.81 cm, length=22.9 cm) and filled with 177 grams each of 16×40 mesh carbon molecular sieve. Beds B3 and B4 are constructed of stainless steel tubing (OD=2.54 cm, ID=2.36 cm, length=76.2 cm) and filled with 230 grams each of 16×40 mesh 5AMG zeolite molecular sieve. A full scale model of the apparatus suitable for use in an aircraft oxygen system would require greater quantities of carbon molecular sieve and 5AMG zeolite molecular sieve. The apparatus also includes one manual valve V1, six air operated valves V2–V7, a solenoid actuator valve V8, and a programmable solenoid actuator unit 300. Compressed air at 75 PSIA is supplied via line 230 to the valve V8. The apparatus was operated at an optimum cycle time of 15 seconds, an inlet pressure of 45 PSIA of compressed air, and an exhaust pressure of 14.4 PSIA. The apparatus did not have an outlet purge flow orifice for beds B1 and B2, however, beds B3 and B4 had a 0.071 cm diameter purge orifice 100.

During operation, valve V1 is open, and the adsorbent beds are alternately cycled through steps of adsorption and desorption. In the first half-cycle of operation valves V2, V5, and V7 are activated open for a period of 7.5 seconds by a 115 VAC signal from the programmable solenoid actuator 300 which activates valve V8, thereby supplying 75 PSIA pressure to activate the air operators on valves V2, V5 and V7, while the valves V3, V4, and V6 are closed. Inlet air at line 210 via valve V5 and line 212 pressurizes beds B3 and B1 in series, and establishes a product flow at the outlet port of bed B1 via line 214, valve V2, line 216, and valve V1 to line 220. As the air passes through the adsorbent beds, nitrogen is preferentially adsorbed in bed B3 and argon is preferentially adsorbed in bed B1, so that oxygen is concentrated. Simultaneously, bed B2 is regenerated by partial depressurization into bed B4. Also, bed B4 is regenerated by depressurization to the ambient pressure via line 222 and valve V7 to line 221, a purge flow from the product of bed B3 at line 213 which passes through the orifice 100, and a purge flow resulting from the partial depressurization of bed B2. This depressurization exhausts the previously adsorbed nitrogen and argon to the ambient surroudings.

During the second half-cycle valves V3, V3, and V6 are energized open for a period of 7.5 seconds, while the valves V2, V5, and V7 are closed. During this phase of the cycle beds B4 and B2 are pressurized from line 210 via valve V6 and line 222 and produce product gas from the outlet 220 via line 224, valve V3, line 226 and valve V1; while beds B3 and B1 are depressurized via line 212 and valve V4 to line 211. By repeating these steps of adsorption and desorption, a continuous stream of very high purity oxygen is produced. Additionally, it should be noted that a purge is not required for regeneration of the carbon molecular sieve adsorbent beds B1 and B2 during the depressurization phase of the cycle. This feature improvees the efficiency by reducing the feed gas consumption.

A schematic electrical diagram of the programmable solenoid actuator 300, which provides the timing for controlling the operation of the valves V2–V7, is shown in FIG. 3 of our secondary purifier patent. The unit 300 is supplied 115 volt AC power via a line 310. There are four female output receptacles, comprising a pair 1A and 2A in parallel, and another pair 1B and 2B in parallel. The AC power from line 310 is connected to the receptacles 1A and 2A during the first half-cycle of the bed operation, and to the receptacles 1B and 2B during the other half-cycle. There is a switch 312 for turning on the power, and a neon lamp 314 for indicating power on. "Programmable" refers to the timing being adjustable, as controlled by a thumbwheel switch 316 and a potentiometer with a control 318. The unit 300 may be any apparatus which provides for programming of the operation of the valves V2–V7 in equal half cycles, with an adjustable cycle time.

The valves V2–V7 are air operated valves (Whitney model #SS-92M4-NC). These are normally closed valves which are actuated open upon receiving an air pressure signal. Compressed air for operation of the valves V2–V7 is supplied via a solenoid operated valve V8 (Numatic Model MK-7 #11SAD4410). The solenoid is connected to receptacle 1A or 2A of the actuator 300. During one half cycle, the valve V8 is energized to supply compressed air at 75 PSIA from a line 230 to an air line A to actuate the valves V2, V5 and V7; and during the alternate half cycles, when the valve V8 is not energized, air from line 230 is supplied from line 230 and valve V8 via an air line B to actuate the valves V3, V4 and V6. The manual valve V1 may be Whitey Model #SS-21RS4-A.

In testing it was found that performance improved after leaks in the PVC beds B1 and B2 were repaired and the amount of carbon molecular sieve pellets per bed was increased from 167 grams to 177 grams. Data was taken at an inlet pressure of 45 PSIA (lbs./sq. inch abs.) and a temperature of 297 K. The best result was found at an inlet flow of 28.65 (SLPM), a product flow of 100 (SCCM), and a cycle time of 15.0 seconds (7.5 seconds for each half cycle); which produced product gas at line 220 measured as 99.10% $O_2$, 0.63% Ar and 0.31% $N_2$.

After testing several types of carbon molecular sieves we have determined that use of Takeda 3A, manufactured by Takeda Chemical Industries, Ltd., Japan, results in optimum performance of both the invention covered herein and in the invention covered by said related copending secondary purifier patent application.

ALTERNATIVE EMBODIMENT

Figure 2:
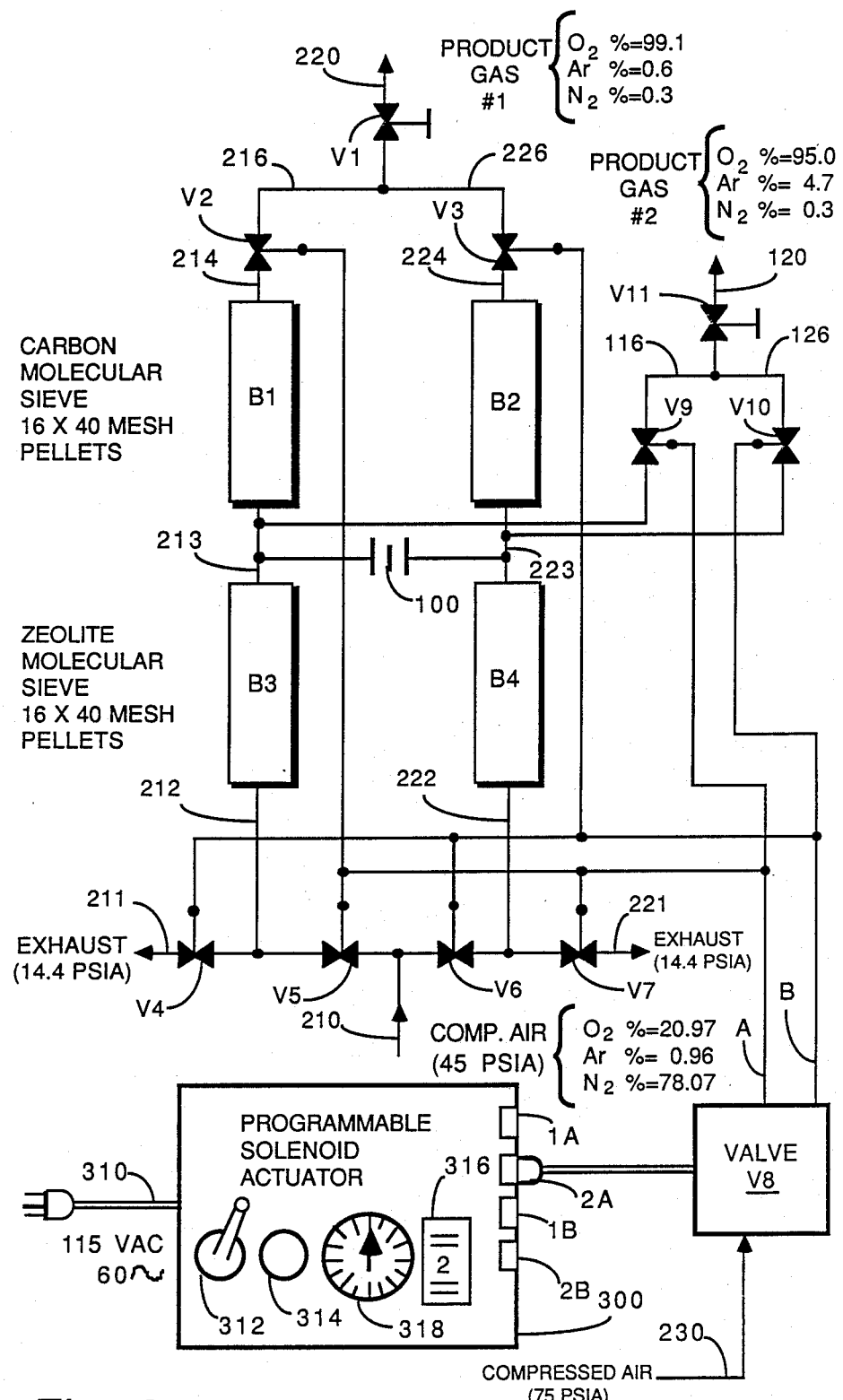
FIG. 2 is a schematic diagram showing an alternate for the concentrator of FIG. 1.

The apparatus can be configured as shown in FIG. 2 in a manner that product gases may be withdrawn at line 220 and/or line 120. The first product gas at line 220 is produced the same as shown in FIG. 1. The second product gas flow at line 120 possesses a maximum oxygen concentration of 95%. Air operated valves V9 and V10 are like valves V2 and V3, and a manual valve V11 is like valve V1. Valves V9 and V10 have inlets connected to lines 213 and 223 respectively at either end of the orifice 100, outlets via lines 116 and 126 to valve V11, and control inputs to the air lines A and B from the valve V8. The valve V11 connects the lines 116 and 126 to the outlet line 120. During the first half cycle product flow with 95% oxygen concentration may be withdrawn from bed B3 via valves V9 and V11. During the second half cycle the product flow is withdrawn from bed B4 through valves V10 and V11. This configuration would be beneficial if one desired two product streams, one with about 99% purity and the other with 95% purity.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A process for producing oxygen with a low proportion of argon from a feed gas which is compressed air, using first and second beds containing 16X40 mesh carbon molecular sieve, and third and fourth beds containing 16X40 mesh zeolite molecular sieve, operating by alternately cycling said beds through steps of adsorption and desorption, each cycle having first and second half cycles, comprising:

in each first half-cycle of operation passing said feed gas under pressure through the third and first beds in series to pressurize the beds and provide a flow of product gas at an outlet port to preferentially absorb nitrogen in the third bed and argon in the first bed and concentrate oxygen, while simultaneously the second and fourth beds are depressurized and the nitrogen and argon absorbed during the previous cycle are desorbed and exhausted;

and in each second half-cycle of operation passing said feed gas under pressure through the fourth and second beds in series to pressurize the beds and provide a flow of product gas at the outlet port to preferentially adsorb nitrogen in the fourth bed and argon in the second bed and concentrate oxygen, while simultaneously the first and third beds are depressurized and the nitrogen and argon adsorbed during the previous cycle are desorbed and exhausted;

whereby by repeating these steps of adsorption and desorption, a continuous stream of oxygen is produced having a purity substantially greater than that of the feed gas (up to 99.1%).

2. A process according to claim 1, in which there is no purge for regeneration of the first and second beds during the depressurization phase of the cycle, but only for the third and fourth beds, whereby the efficiency is improved by reducing the feed gas comsumption;

wherein the pressure of the feed gas is in the range of 25 to 70 PSIA;

the exhaust is at the ambient or lower pressure; and the full cycle time (two half cycles) is in the range of 5 to 20 seconds.

3. A process according to claim 1, wherein the beds at one end are alternately coupled to a feed gas source or to ambient via air operated valves, and at the other end alternately to a product gas outlet via air operated valves, and the process includes selectively operating said valves so that in the first half cycle the third bed is connected to the feed gas source and the first bed to the product gas outlet, while the fourth bed is connected to ambient; and in the second half cycle the fourth bed is connected to the feed gas source and the second bed to the product gas outlet, while the third bed is connected to ambient.

4. A process according to claim 3, in which there is no purge for regeneration of the first and second beds during the depressurization phase of the cycle, but only for the third and fourth beds, whereby the efficiency is improved by reducing the feed gas consumption;

wherein the pressure of the feed gas is in the range of 25 to 70 PSIA;

the exhaust is to the ambient or lower pressure; and the full cycle time (two half cycles) is in the range of 5 to 20 seconds.

5. An apparatus for producing oxygen with a low proportion of argon from a feed gas which is compressed air, comprising:

first and second beds containing 16×40 mesh carbon molecular sieve, and third and fourth beds containing 16X40 mesh zeolite molecular sieve, each bed having a first end and a second end, the first and third beds being placed in series by connecting the second end of the third bed to the first end of the first bed, the second and fourth beds being placed in series by connecting the second end of the fourth bed to the first end of the second bed, an inlet port coupled to a source of feed gas under pressure, an outlet port for product gas, an exhaust port which is at a substantially lower pressure than the inlet port;

a first set of valves comprising a first inlet valve coupling the inlet port to the first end of the third bed, a first outlet valve coupling the second end of the first bed to the outlet port, and a first exhaust valve coupling the first end of the fourth bed to the exhaust port;

a second set of valves comprising a second inlet valve coupling the inlet port to the first end of the fourth bed, a second outlet valve coupling the second end of the second bed to the outlet port, and a second exhaust valve coupling the first end of the first bed to the exhaust port;

timing means for controlling operation of said valves in recurring cycles having equal first and second half cycles, with actuation means effective during the first half cycle to actuate the first set of valves open with the second set of valves closed, the actuation means being effective during the second half cycle to actuate the second set of valves open with the first set of valves closed;

so that in each half-cycle of operation said feed gas passes under pressure through the third and first beds to pressurize the beds and provide a flow of product gas at the outlet port to preferentially absorb nitrogen in the third bed and argon in the first bed and concentrate oxygen, while simultaneously the second and fourth beds are depressurized and the nitrogen and argon adsorbed during the previous cycle are desorbed and exhausted;

and in each second half-cycle of operation said feed gas passes under pressure through the fourth and second beds to pressurize the beds and provide a flow of product gas at the outlet port to preferentially adsorb nitrogen in the fourth bed and argon in the second bed and concentrate oxygen, while simultaneously the first and third beds are depressurized and the nitrogen and argon adsorbed during the previous cycle are desorbed and exhausted;

whereby by cyclically repeating the operation of adsorption and desorption, a continuous stream of oxygen is produced having a purity substantially greater than that of the feed gas (up to 99.1%).

6. Apparatus according to claim 5, including purge means for regeneration of the third and fourth beds during the depressurization phase of the cycle, but no purge means for the first and second beds, whereby the efficiency is improved by reducing the feed gas consumption;

wherein the pressure of the feed gas is in the range of 25 to 70 PSIA;

the exhaust is at the ambient or lower pressure; and the full cycle time (two half cycles) is in the range of 5 to 20 seconds.

7. Apparatus according to claim 5, wherein said valves of the first and second sets are air operated valves, and the actuation means comprises a solenoid actuated valve having an inlet coupled to a source of air under pressure, and having two outlets coupled respectively to first and second valve control lines, the first valve control line being coupled to actuation means of each of said valves of the first set, the second valve control lines being coupled to actuation means of each of said valves of the second set, said solenoid actuated valve having a solenoid coupled to the timing means to be actuated during the first half cycle to supply air from said source to the first valve control line to actuate the valves of the first set, and during the second half cycle to supply air from said source to the second valve control line to actuate the valves of the second set.

8. Apparatus according to claim 7, wherein said outlet port is a first outlet port for high purity oxygen, and there is further included a second outlet port for oxygen of purity up to 95%, with first and second manual valves at said first and second outlet ports respectively;

wherein said first set of valves further includes a third outlet valve coupling the second end of the third bed to the second outlet port, and said second set of valves further includes a fourth outlet valve coupling the second end of the fourth bed to the second outlet port.

9. Apparatus according to claim 8, including purge means for regeneration of the third and fourth beds during the depressurization phase of the cycle, but no purge means for the first and second beds, whereby the efficiency is improved by reducing the feed gas consumption;

wherein the pressure of the feed gas is in the range of 25 to 70 PSIA;

the exhaust is at the ambient or lower pressure; and the full cycle time (two half cycles) is in the range of 5 to 20 seconds.

* * * * *

UNITED STATES PATENT AND TRADEMARK OFFICE
CERTIFICATE OF CORRECTION

PATENT NO. : 4,880,443

DATED : November 14, 1989

INVENTOR(S) : George W. Miller et al

It is certified that error appears in the above-identified patent and that said Letters Patent is hereby corrected as shown below:

Col 1, line 30, second occurrence of "as" should be "gas".
Col 1, line 53-54, correct the spelling of "surroundings".
Col 2, line 7, "xeolite" should be "zeolite".
Col 2, line 17, "friction" should be "fraction".
Col 2, line 26, "plurality" should be "purity".
Col 4, line 47, correct the spelling of "surroundings".
Col 4, line 48, "V3, V3, and V6" should be "V3, V4, and V6".
Col 4, line 61, correct the spelling of "improves".
Col 5, line 13, "(Whitney" should be "(Whitey".
Col 5, line 55, "V11" should be "V10".
Col 6, claim 1, line 16, "absorb" should be "adsorb".
Col 6, claim 1, line 23, "absorb" should be "adsorb".
Col 6, claim 2, line 6, "comsumption" should be "consumption".
Col 7, claim 5, line 45, after "each" insert --first--.
Col 7, claim 5, line 49, "absorb" should be "adsorb".
Col 8, claim 7, line 10, "lines" should be "line".

Signed and Sealed this

Twenty-fifth Day of December, 1990

Attest:

HARRY F. MANBECK, JR.

*Attesting Officer*     *Commissioner of Patents and Trademarks*